US010950142B2

(12) United States Patent
Cummins

(10) Patent No.: US 10,950,142 B2
(45) Date of Patent: Mar. 16, 2021

(54) ELECTRICAL CIRCUIT TRAINING APPARATUS

(71) Applicant: Perry Cummins, Pittsburg, KS (US)

(72) Inventor: Perry Cummins, Pittsburg, KS (US)

( * ) Notice: Subject to any disclaimer, the term of this patent is extended or adjusted under 35 U.S.C. 154(b) by 466 days.

(21) Appl. No.: 15/839,180

(22) Filed: Dec. 12, 2017

(65) Prior Publication Data

US 2018/0165990 A1 Jun. 14, 2018

Related U.S. Application Data

(60) Provisional application No. 62/433,407, filed on Dec. 13, 2016.

(51) Int. Cl.
| G09B 23/00 | (2006.01) |
| G09B 23/18 | (2006.01) |
| G09B 19/00 | (2006.01) |

(52) U.S. Cl.
CPC ....... *G09B 23/183* (2013.01); *G09B 19/0069* (2013.01); *G09B 23/181* (2013.01)

(58) Field of Classification Search
CPC .................................................. G09B 23/183
USPC ....................................................... 434/301
See application file for complete search history.

(56) References Cited

U.S. PATENT DOCUMENTS

| 2010/0146991 A1* | 6/2010 | Ilercil | ..................... F25B 21/02 |
| | | | 62/3.3 |
| 2012/0206848 A1* | 8/2012 | Gillespie | ................... H01T 4/06 |
| | | | 361/104 |

* cited by examiner

*Primary Examiner* — Kesha Frisby
(74) *Attorney, Agent, or Firm* — Dale J. Ream

(57) ABSTRACT

A circuit training apparatus for training students to understand electrical circuits includes a body member that includes a front face having a peripheral edge and a plurality of side walls defining an interior area and a dial opening. The apparatus includes a battery for powering the circuits. A circuit board is positioned in the body member, the circuit board having a plurality of circuit areas etched thereon and having a plurality of current lead lines electrically connecting the battery and circuit areas, respectively. A rotary selection device is electrically connected to the circuit board and battery and includes a dial indicative of a circuit selection coupled to an electrical switch for directing current from the battery to a respective current lead line associated with the circuit selection. The dial of the rotary selection device extends away from the circuit board and through the dial opening for accessibility to a user.

20 Claims, 7 Drawing Sheets

ELECTRICAL CIRCUIT TRAINING APPARATUS

REFERENCE TO RELATED APPLICATIONS

This application claims the benefit of provisional patent application U.S. Ser. No. 62/433,407 filed Dec. 13, 2016 titled "Small self contained pre-wired live electrical Mini-Boards that simulate circuits for training the principles, measurements, and calculations for Ohms Law circuits. Each Board contains several practice circuits. The three boards are 1 each for Series Circuits, Parallel Circuits, and Series-Parallel Circuits. Each circuit contains different resistances for each Practice" and which is incorporated herein by reference.

BACKGROUND OF THE INVENTION

The present invention relates generally to educational training devices and, more particularly, to a circuit training apparatus having multiple circuits and having a rotary dial with which a student selects a circuit to investigate.

Understanding the basics of electricity requires understanding Ohms law of resistance, voltage, and current. Traditionally, students study, measure, and learn about circuits by building circuits with wires and electronic components. Unfortunately, students spend an excessive amount of time building circuits and not enough time learning measurements, multimeter operation, and calculations. The jumper wires used to build the circuits are confusing to the students and requires the circuit be connected properly to study them. Loose components become lost, do not function correctly, and are otherwise messy. Students end up building the circuits incorrectly which leads to confusion and frustration. In many cases the students do not have time to build and study the circuits in the time provided for class. The mess of teardown and loss of components and storage are almost always a problem—to the student and to the teacher.

Circuits may be arranged in different ways and function accordingly. For instance, a student must be proficient in constructing, measuring, and understanding parallel circuits, series circuits, and combinations thereof. A student must understand Ohms Law and its calculations. Learning is achieved more quickly with a hands-on apparatus which allows the selection and study of multiple circuits with each circuit being selectable using an electromechanical rotary selection device.

Therefore, it would be desirable to have a circuit training apparatus having multiple circuits positioned on a device, each circuit being independent and separate from the others and capable of being measured by a multimeter when selected. In other words, it would be desirable to have a circuit training apparatus which allows the selection and study of multiple circuits with each circuit being selectable using an electromechanical rotary selection device.

SUMMARY OF THE INVENTION

A circuit training apparatus for training students to build and use parallel, series, and combination electrical circuits according to the present invention includes a body member that includes a front face having a peripheral edge and a plurality of side walls extending rearwardly from the peripheral edge, the front face and the side walls defining an interior area and the body member defining a dial opening. The apparatus includes a battery for powering the circuits. A circuit board is positioned in the interior area of the body member, the circuit board having a plurality of circuit areas etched thereon and having a plurality of current lead lines electrically connecting the battery and the plurality of circuit areas, respectively. A rotary selection device is electrically connected to the circuit board and to the battery, the rotary selection device having a dial indicative of a circuit selection coupled to an electrical switch for directing current from the battery to a respective current lead line associated with the circuit selection. The dial of the rotary selection device extends away from the circuit board and through the dial opening for accessibility to a user.

The invention described herein mitigates or eliminates the problems experienced with traditional circuit training, including eliminating the clutter of jumper wires and loose components to train complex electrical principals and the circuits related to the basic principles of electricity. It also eliminates the safety issues related to short circuits and bulky power supplies. The present invention enables a student a hands-on means to learn the measurements and calculations related to Ohms Law involving series circuits, parallel circuits, and series-parallel circuits.

Therefore, a general object of this invention is to provide a circuit training apparatus having a plurality of separate and distinct circuits that may be used to teach the calculations of Ohms law.

Another object of this invention is to provide a circuit training apparatus, as aforesaid, having a rotary selection device that enables a student user to select which of the plurality of circuits is energized by a battery.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3d is an isolated view on an enlarged scale taken from FIG. 3a;

FIG. 4b is an isolated view on an enlarged scale taken from FIG. 4a.

DESCRIPTION OF THE PREFERRED EMBODIMENT

Figure 1:
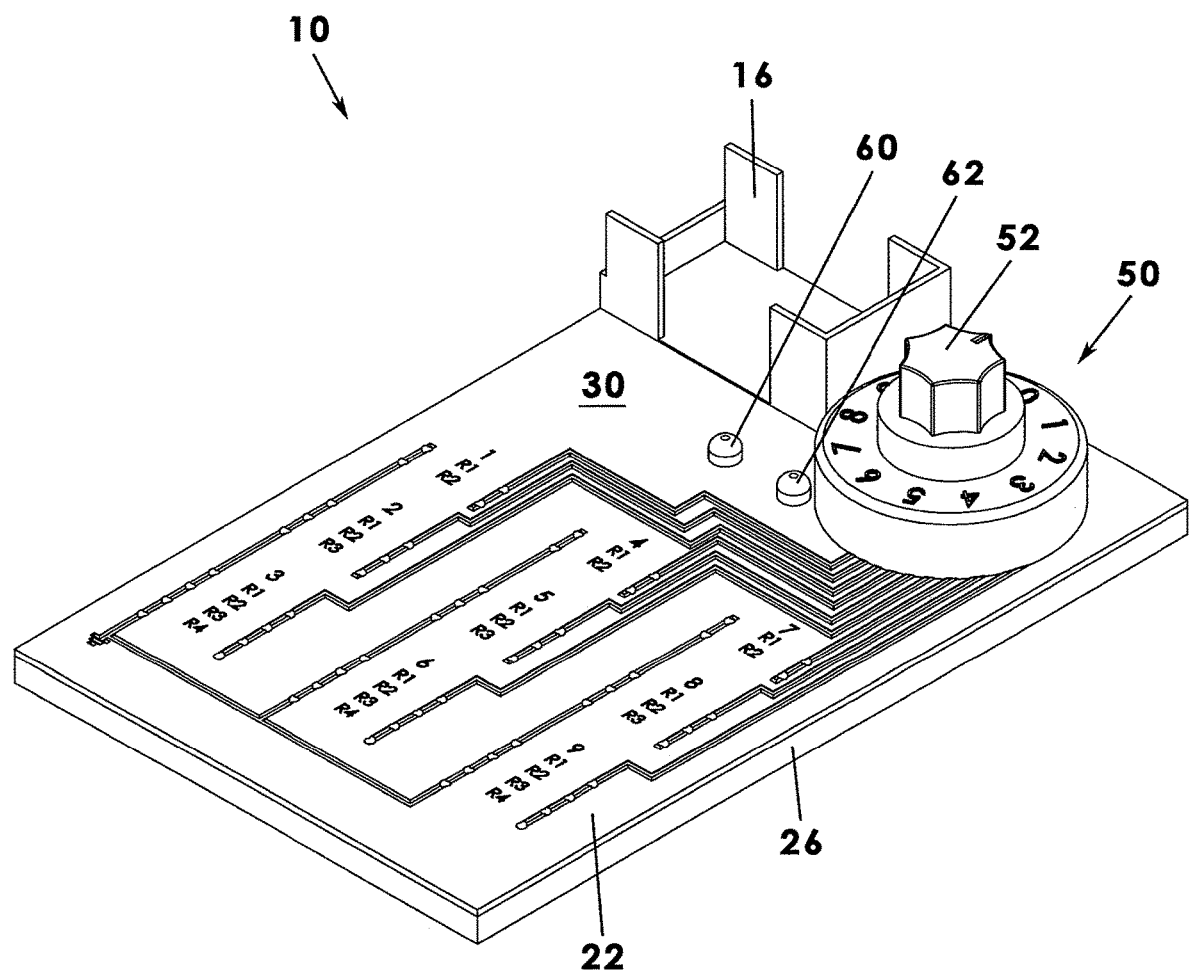
FIG. 1 is a perspective view of a circuit training apparatus according to a preferred embodiment of the present invention.
Figure 2:
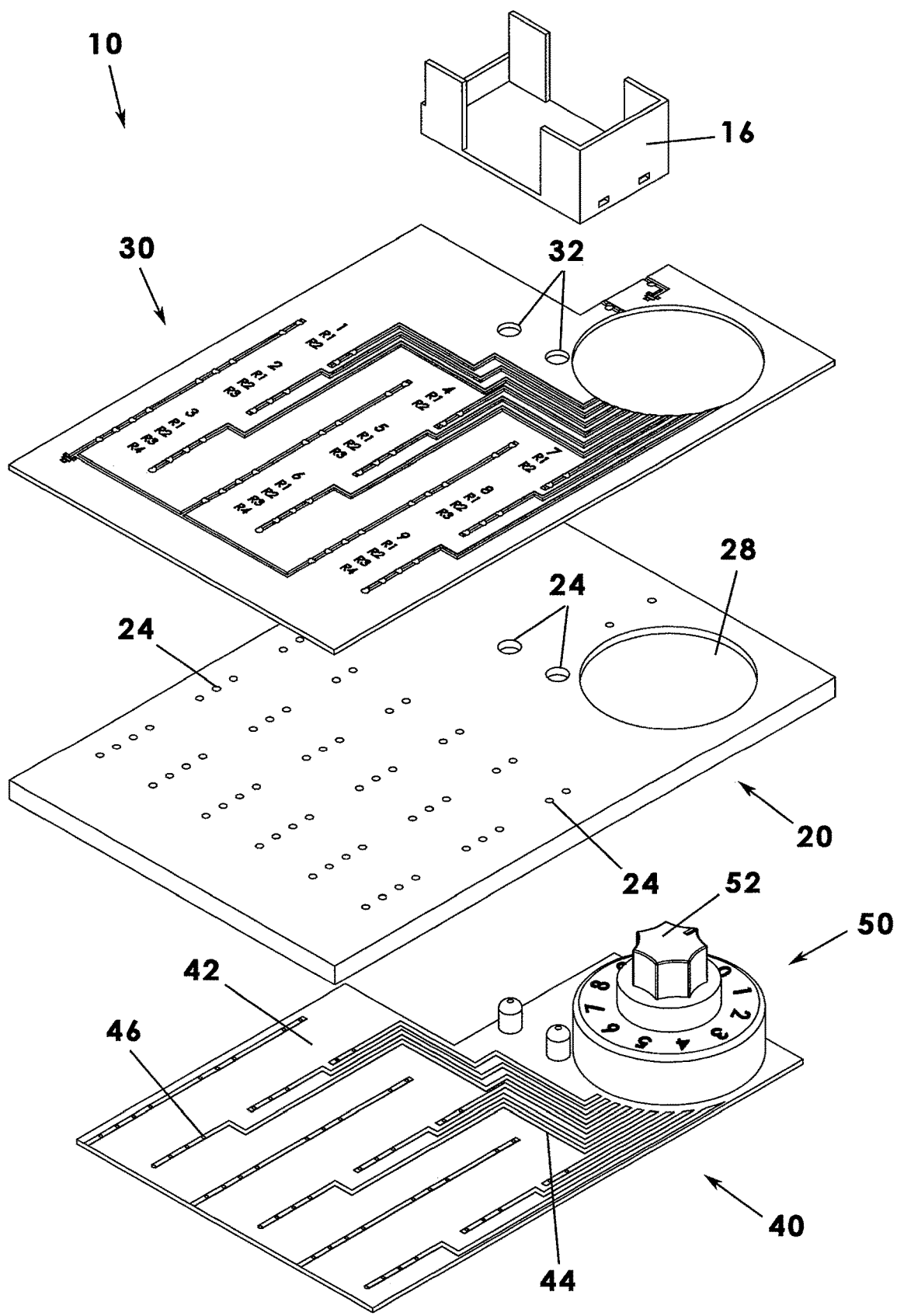
FIG. 2 is an exploded view of the circuit training apparatus as in FIG. 1.
Figure 3A:
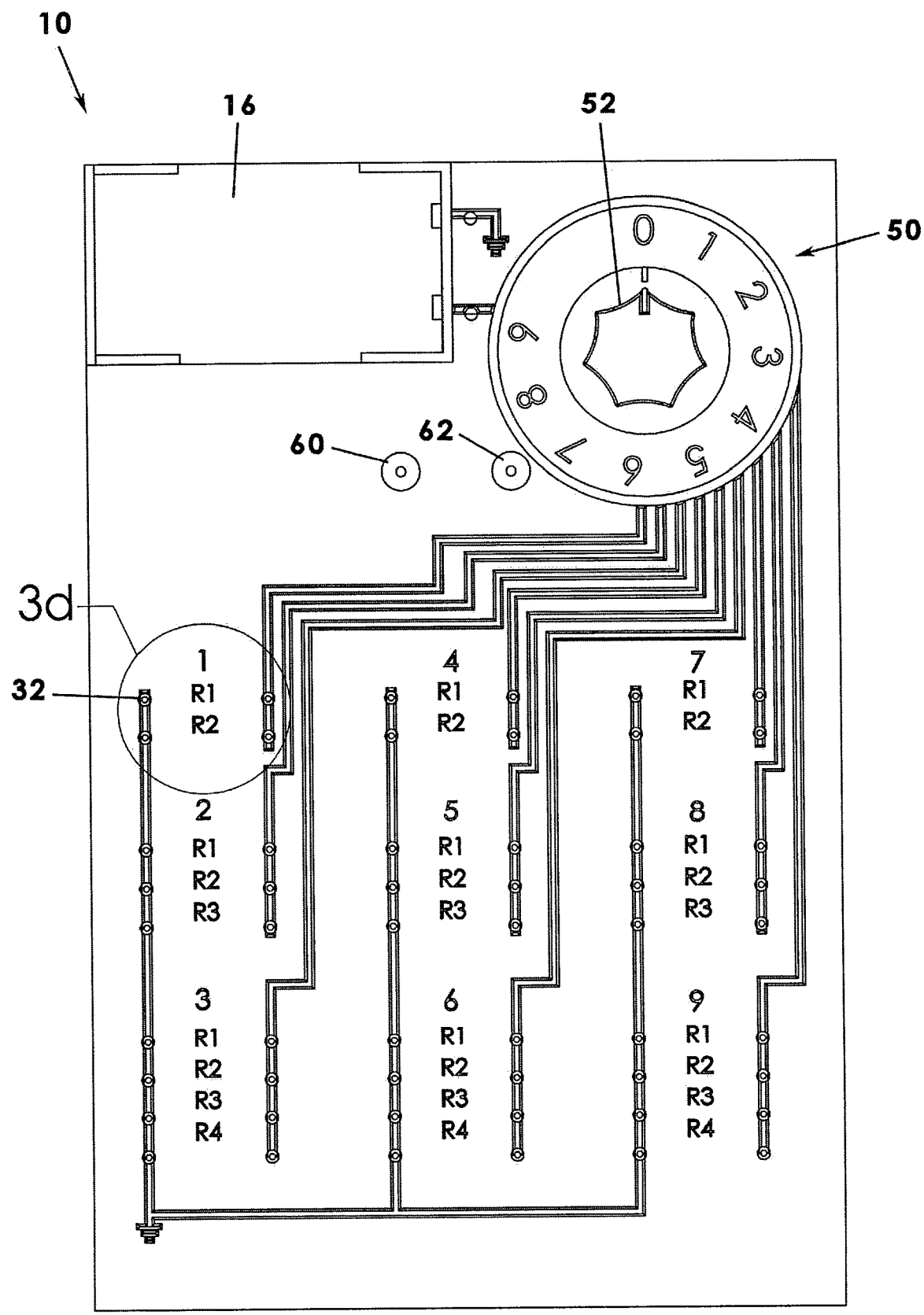
FIG. 3a is a front view of the circuit training apparatus as in FIG. 1, illustrated with the rotary dial in one setting.
Figure 3B:
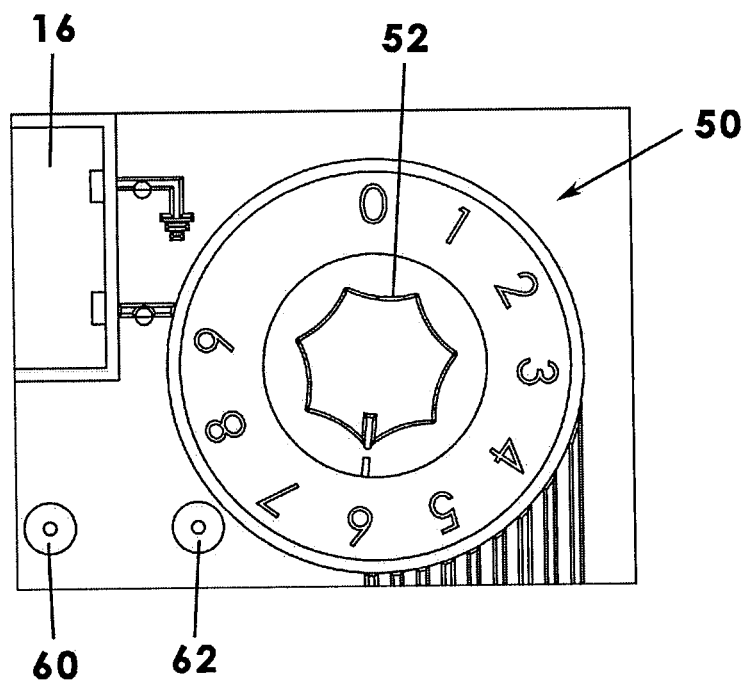
FIG. 3b is a front view of the circuit training apparatus as in FIG. 1, illustrated with the rotary dial in another setting.
Figure 3C:
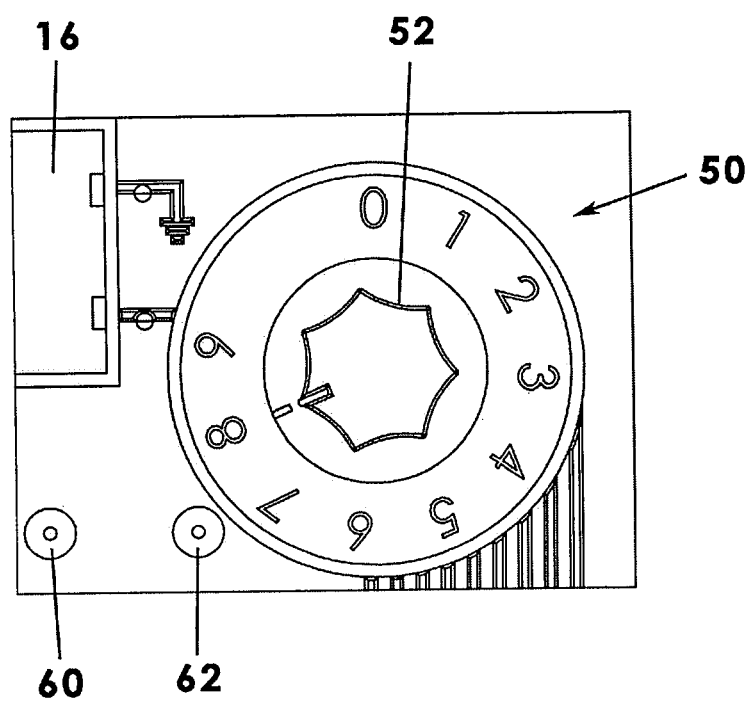
FIG. 3c is a front view of the circuit training apparatus as in FIG. 1, illustrated with the rotary dial in another setting.
Figure 3D:
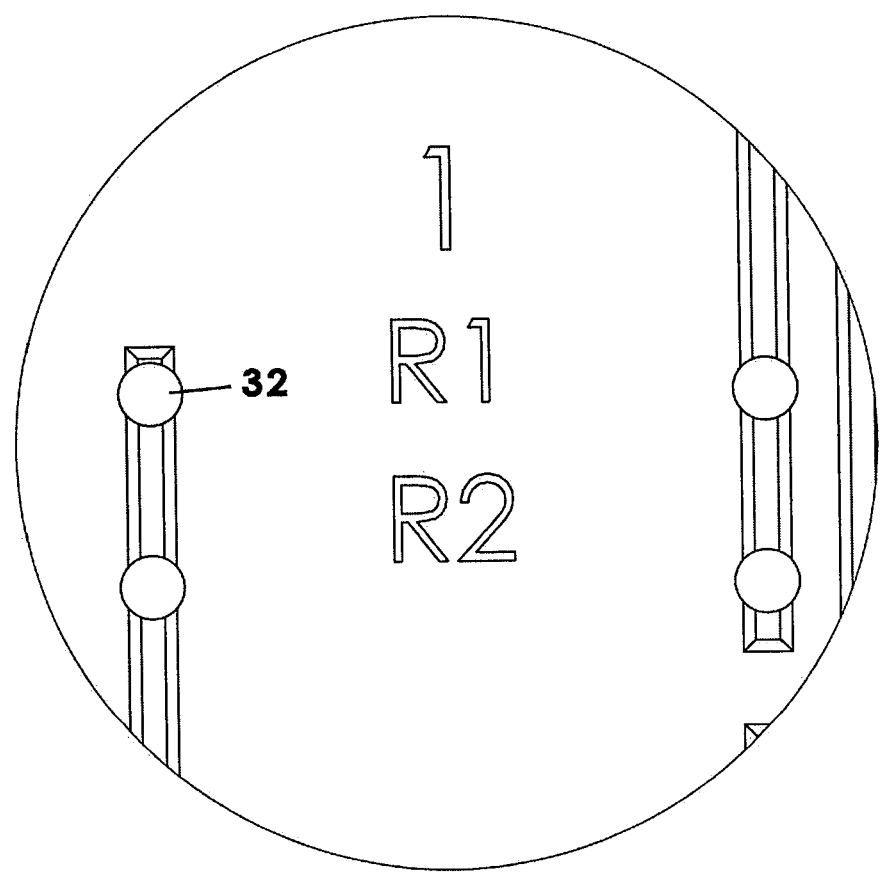
Figure 4A:
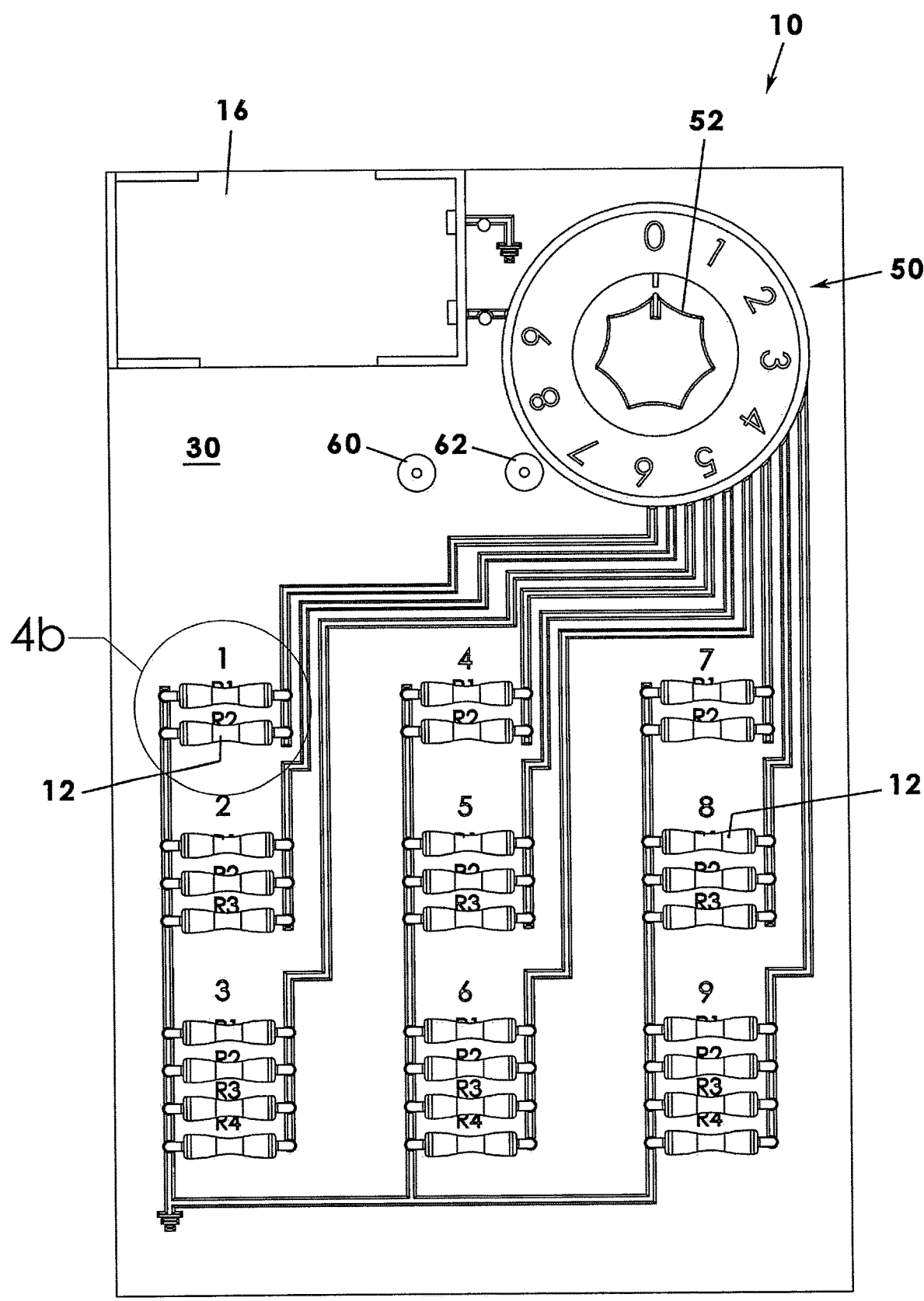
FIG. 4a is a front view of the circuit training apparatus as in FIG. 1 with a plurality of resistors installed.
Figure 4B:
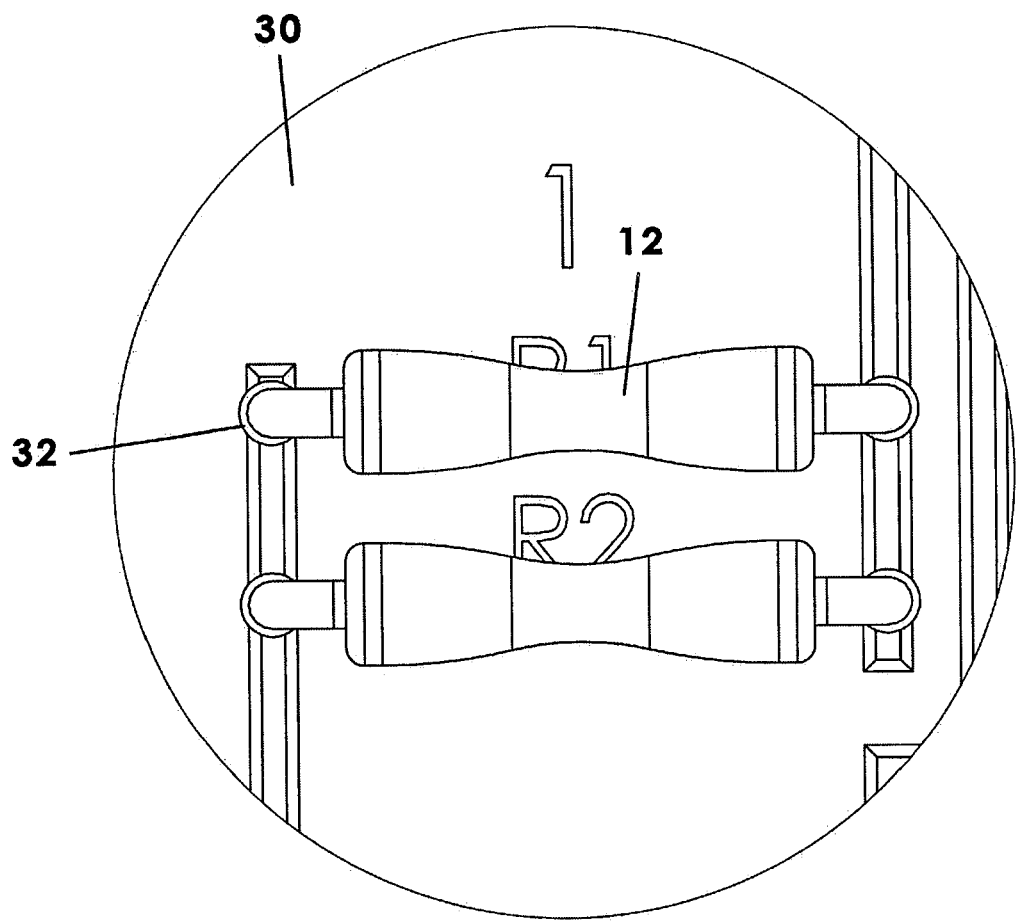

A circuit training apparatus according to a preferred embodiment of the present invention will now be described with reference to FIGS. 1 to 4b of the accompanying drawings. The circuit training apparatus 10 includes a body member 20, a circuit board 40, and a rotary selection device 50.

The body member 20 provides a housing for encasing the circuit board 40 and the rotary selection device 50. In an embodiment, the body member 20 may include a front face 22 having a planar/flat configuration and rectangular shape having a peripheral edge although other shapes would also work. A pair of side walls 26 may extend rearwardly from the peripheral edge and away therefrom, the front face 22 and side walls 26, together, defining an interior space into which the circuit board 40 is received as will be described later. Preferably, the body member 20 is constructed of a transparent plastic material and manufactured using a molding process.

Then, an instructional sheet 30 may be adhesively coupled or overlaid upon a front face 22 of the body member 20. Alternatively, the instructional sheet 30 may be imprinted directly onto the front face 22. The instructional sheet 30 may include indicia (alphanumeric and graphics) having the appearance of the circuits, circuit sections, and current lead lines that are actually etched onto the printed circuit board 40 and which are energized to operate depending on the electronic component connected thereto as will be described in more detail later. In other words, the instructional sheet 30 has an appearance to a student of an actual circuit board.

Further, the circuit training apparatus 10 includes the printed circuit board 40—which may be referred to simply as a circuit board or a "PCB." The circuit board 40 has a flat or planar configuration and has dimensions such that it may be received into the interior area of the body member 20. The body member 20 may also include a back wall for securing the circuit board 40 inside the body member 20. In an embodiment, the back wall may have a felt surface so that the circuit training apparatus 10 is unlikely to damage a surface on which it is laid or slid. A plurality of circuit areas 42 may be imprinted or etched onto the circuit board 40 (and printed correspondingly on the instruction sheet 30). In an embodiment, there may be nine (9) circuit areas with each being spaced apart and independent of the other. In addition, functional current lead lines 44 are etched onto the circuit board 40 connecting each circuit area 42 with the rotational selection device 50 and, as a result and selectively, with current from the battery 14. As will be described later, current is allowed to flow along a selected current lead line 44 when the rotational selection device 50 is rotated and its selector switch is aligned with a corresponding current lead line 44.

Now, more particularly, the rotary selection device 50 is mounted to the circuit board 40 and electrically connected to a battery 14. The battery 14 may be mounted adjacent the rotational selection device 50 and is electrically connected thereto via wires or a printed line. Further, a battery storage frame 16 (also referred to merely as a battery holder) may be mounted on the circuit board 40 and configured to removably receive a battery 14. Accordingly, the battery 14 may be removed and replaced. In this regard, the body member 20 may define a cutout that enables the battery storage frame 16 and battery 14 inserted therein to be accessible to a user. Preferably, the battery 14 is not hidden behind a door or inserted into a compartment although the operations described herein would still work in such an arrangement.

The rotary selection device 50 includes a rotary dial 52 having indicia indicative of a particular circuit that will be energized if rotated and aligned appropriately. Further, the rotary selection device 50 has an electrical switch coupled to the rotary dial 52 which directs current from the battery 14 to the selected current lead line 44. The rotary dial 52 extends upwardly through the dial opening 28 defined by the body member 20 so as to be accessible and operable by a user. In an embodiment, the circuit board 40 and associated instructional sheet 30 include 9 separate circuit areas or circuits. Therefore, the rotary dial 52 includes numeric indicia indicative of the 9 circuit areas (e.g. the numbers 1, 2, 3, and so on). Rotation of the rotary dial 52 positions the switch to enable a user to select which circuit will receive current from the battery 14 via associated current lead lines 44.

Each circuit area 42 on the circuit board 40 includes a pair of holes 46 for receiving opposed leads (i.e. metal prongs) of an electronic component such as a resistor 12 (For simplicity, a resistor will be referred to as the electrical component). At least the first hole is in electrical communication with the associated current lead line 44 so that the electrical component receives electrical current flowing from the battery 14 when the resistor 12 is plugged into the holes 46. It is understood that some circuit areas will include multiple pairs of holes so that multiple resistors 12 may be plugged in and more complex circuits demonstrated to the user, e.g. a student. Further, the front face 22 of the body member 20 and the instructional sheet 30 include identically positioned holes 24, 36, respectively, so that the resistor 12 may be mounted atop the instructional sheet 30 and its leads inserted through the body member 20 to the circuit board 40. In the preferred embodiment, the resistors 12 are mounted in predetermined positions at the point of manufacture and to correspond with associated instructional materials and data recording worksheets or online platforms. The circuits being demonstrated may include series circuits, parallel circuits, and combinations of parallel and series circuits. In other words, resistors may be grouped and connected in different arrangements depending on the type of circuit being studied.

In another aspect, the circuit training apparatus 10 includes one or more status indicator lights. A first indicator lamp 60 and a second indicator lamp 62 are mounted on the circuit board and are in electrical communication with the battery 14 and other circuitry. The body member 20 and instructional sheet 30 may include complementary apertures through which the indicator lamps extend so as to be visible to a user. The first indicator lamp 60 is illuminated, such as by a green light emitting diode (LED), when the current from the battery 14 is available for direction to a selected circuit. In other words, the first indicator lamp 60 indicates when the unit is "on." Similarly, the second indicator lamp 62 is configured to illuminate, such as by a red LED, if an overload or short circuit of one of the circuits is detected.

In use, a student is presented with or may otherwise obtain a circuit training apparatus 10 according to the invention as described above. The multiple circuits focus learning on aspects of Ohm's Law. The rotary dial 52 and selection switch may be rotated to select a specific circuit and power from the battery 14 is directed to the selected circuit. Supporting coursework or live instruction will enable a student to obtain readings from and take measurements using a multimeter, also referred to as a digital volt-ohm-millimeter (DVOM). Specifically, a DVOM can be used to measure volts, voltage drop, amps, and resistance on prewired, pre-calculated, and pre measured electrical boards. A DVOM is small, easily stored, and powered with a standard 9 volt battery. When the circuit is selected on the dial that corresponds with the practice circuit selected, power is supplied to the circuit and then can be used to take all measurements involved with the online or printed courseware. The individual learns to use the DVOM and the principles of live electrical circuits.

It is understood that while certain forms of this invention have been illustrated and described, it is not limited thereto except insofar as such limitations are included in the following claims and allowable functional equivalents thereof.

The invention claimed is:

1. A circuit training apparatus for training students to build and use parallel, series, and combination electrical circuits, said circuit training apparatus comprising:
a body member that includes a front face having a peripheral edge and a plurality of side walls extending away from said peripheral edge, said front face and said plurality of side walls of said body member defining an interior area;
a battery having stored electrical current mounted on said circuit board and protruding through said cutout of said front face of said body member;
a circuit board positioned in said interior area of said body member, said circuit board having a plurality of circuit areas etched thereon and having a plurality of current lead lines electrically connecting said battery and said plurality of circuit areas, respectively;
a rotary selection device electrically connected to said circuit board and to said battery, said rotary selection device having a dial that includes indicia indicative of a circuit selection coupled to an electrical switch for directing current from said battery to a respective current lead line associated with said circuit selection by said dial;
wherein said body member defines a dial opening, said dial of said rotary selection device extending away from said circuit board and through said dial opening for accessibility to a user.

2. The circuit training apparatus as in claim 1, wherein each circuit area includes at least a pair of holes configured for selectively receiving opposed leads of an electronic component, at least one hole being in electrical communication with an associated current lead line.

3. The circuit training apparatus as in claim 2, wherein said body member defines a plurality of holes identically positioned and aligned with corresponding holes of said circuit board.

4. The circuit training apparatus as in claim 3, further comprising an instructional sheet adhesively attached to said front face of said body member, said instructional sheet having indicia indicative of said plurality of circuit areas, the electronic components being positioned atop said instructional sheet when coupled to said circuit board.

5. The circuit training apparatus as in claim 4, wherein said instructional sheet defines a plurality of holes identically positioned and aligned with corresponding holes of said circuit board and said body member.

6. The circuit training apparatus as in claim 3, further comprising an instructional sheet adhesively attached to said front face of said body member, said instructional sheet having indicia indicative of said plurality of circuit areas, the electronic components being positioned atop said instructional sheet when coupled to said circuit board.

7. The circuit training apparatus as in claim 1, wherein each circuit area includes a plurality of holes for selectively receiving opposed leads of electronic components in a series circuit arrangement.

8. The circuit training apparatus as in claim 1, wherein each circuit area includes a plurality of holes for selectively receiving opposed leads of electronic components in a parallel circuit arrangement.

9. The circuit training apparatus as in claim 1, wherein each circuit area includes a plurality of holes for selectively receiving opposed leads of electronic components in a series circuit arrangement.

10. The circuit training apparatus as in claim 1, further comprising a battery storage frame mounted to said circuit board for receiving said battery.

11. The circuit training apparatus as in claim 10, wherein said body member includes a cutout allowing said battery storage frame to extend away from said circuit board, said cutout positioned adjacent said rotary selection device.

12. The circuit training apparatus as in claim 1, wherein:
said dial includes numeric indicia indicative of at least 9 circuit areas;
said plurality of current lead lines includes one current lead line associated with each of said at least 9 circuit areas.

13. The circuit training apparatus as in claim 1, further comprising:
a first indicator lamp in electrical communication with said battery and configured to illuminate when said voltage from said battery is available;
a second indicator lamp in electrical communication with said circuit areas and configured to illuminate if an overload or short circuit is detected.

14. A circuit training apparatus for training students to build and use parallel, series, and combination electrical circuits, said circuit training apparatus comprising:
a body member that includes a front face having a peripheral edge and a plurality of side walls extending rearwardly from said peripheral edge, said front face and said side walls defining an interior area and said body member defining a dial opening;
a battery having stored electrical current mounted on said circuit board and protruding through said cutout of said front face of said body member;
a circuit board positioned in said interior area of said body member, said circuit board having a plurality of circuit areas etched thereon and having a plurality of current lead lines electrically connecting said battery and said plurality of circuit areas, respectively;
a rotary selection device electrically connected to said circuit board and to said battery, said rotary selection device having a dial indicative of a circuit selection coupled to an electrical switch for directing current from said battery to a respective current lead line associated with said circuit selection;
wherein said dial of said rotary selection device extends away from said circuit board and through said dial opening for accessibility to a user to make said circuit selection.

15. The circuit training apparatus as in claim 14, wherein each circuit area includes at least a pair of holes configured for selectively receiving opposed leads of an electronic component, at least one hole being in electrical communication with an associated current lead line.

16. The circuit training apparatus as in claim 15, wherein each circuit area includes a plurality of holes for selectively receiving opposed leads of electronic components in a series circuit arrangement.

17. The circuit training apparatus as in claim 16, wherein each circuit area includes a plurality of holes for selectively receiving opposed leads of electronic components in a parallel circuit arrangement.

18. The circuit training apparatus as in claim 16, wherein each circuit area includes a plurality of holes for selectively receiving opposed leads of electronic components in a series circuit arrangement.

19. The circuit training apparatus as in claim 16, wherein:
said dial includes numeric indicia indicative of at least 9 circuit areas;

said plurality of current lead lines includes one current lead line associated with each of said at least 9 circuit areas.

20. The circuit training apparatus as in claim 14, wherein said plurality of circuit areas includes at least one parallel circuit, at least one series circuit, and at least one combined series and parallel circuit.

\* \* \* \* \*